(12) United States Patent
Jang (10) Patent No.: US 8,903,316 B2
(45) Date of Patent: Dec. 2, 2014

(54) APPARATUS AND METHOD FOR CONNECTING WITH BLUETOOTH DEVICES IN PORTABLE TERMINAL

(75) Inventor: Jin-Ho Jang, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 379 days.

(21) Appl. No.: 13/286,491

(22) Filed: Nov. 1, 2011

(65) Prior Publication Data

US 2012/0115464 A1 May 10, 2012

(30) Foreign Application Priority Data

Nov. 4, 2010 (KR) .................. 10-2010-0109008

(51) Int. Cl.
*H04B 7/00* (2006.01)
*H04W 8/00* (2009.01)
*G01S 5/02* (2010.01)
*H04W 76/02* (2009.01)
*H04W 64/00* (2009.01)

(52) U.S. Cl.
CPC ............ *H04W 8/005* (2013.01); *H04W 76/023* (2013.01); *G01S 5/0205* (2013.01); *H04W 64/006* (2013.01)
USPC ..................................... 455/41.2; 455/426.1

(58) Field of Classification Search
CPC ................................ H04W 4/06; H04W 84/20
USPC ................................... 455/41.2, 426.1
See application file for complete search history.

(56) References Cited

U.S. PATENT DOCUMENTS

| 8,208,913 | B2* | 6/2012 | Allen et al. | 455/417 |
| 2007/0042714 | A1* | 2/2007 | Ayed | 455/41.2 |
| 2008/0248801 | A1* | 10/2008 | Fletcher et al. | 455/435.2 |
| 2009/0295729 | A1* | 12/2009 | Kuo et al. | 345/166 |
| 2010/0171430 | A1* | 7/2010 | Seydoux | 315/159 |

* cited by examiner

*Primary Examiner* — Amancio Gonzalez
(74) *Attorney, Agent, or Firm* — Cha & Reiter, LLC (57) ABSTRACT

An apparatus and method for connecting with a plurality of Bluetooth devices is provided in a portable terminal. The apparatus includes a position determining unit and a Bluetooth connecting unit. The position determining unit searches for a second Bluetooth device by using a movement direction of the terminal, when performing a call by the second Bluetooth device while maintaining a call. The Bluetooth connecting unit processes the performance of a call using a first Bluetooth device and the second Bluetooth device. When searching the second Bluetooth device, the Bluetooth connecting unit releases the connection of the first Bluetooth device while maintaining the call and performs a connection with the second Bluetooth device.

20 Claims, 6 Drawing Sheets

APPARATUS AND METHOD FOR CONNECTING WITH BLUETOOTH DEVICES IN PORTABLE TERMINAL

CLAIM OF PRIORITY

This application claims priority under 35 U.S.C. §119 from an application filed in the Korean Intellectual Property Office on Nov. 4, 2010 and assigned Ser. No. 10-2010-0109008, the contents of which are incorporated herein by reference in its entirety.

BACKGROUND OF THE INVENTION

1. Field of the Invention

The present invention relates generally to a Bluetooth apparatus and method for a portable terminal. More particularly, the present invention relates to an apparatus and method for switching a call to a peripheral Bluetooth device in a portable terminal and detecting a peripheral Bluetooth device to which a user desires to switch a call.

2. Description of the Related Art

The use of portable terminals is rapidly increasing due to their portability and increasing functionality. Service providers (terminal manufacturers) of mobile terminals are competitively developing more convenient functions in order to attract more users.

For example, the portable terminals provide various functions such as a phone book, a game, a scheduling management function, a Short Message Service (SMS), a Multimedia Message Service (MMS), a Broadcast Message Service (BMS), an Internet service, an Electronic mail (E-mail) service, a morning call, a MP3 (MPEG Audio Layer-3), digital camera and a wide variety of services not mentioned above.

Portable terminals also provide various services such as headset, music, printing and file transmission by a Bluetooth function among the near field communication technologies have recently been launched.

Bluetooth uses 2.4 GHz band frequency of ISM (Industrial Scientific Medical) band to define wireless communication between various terminals and Bluetooth devices. If there is another peripheral Bluetooth device, a host device searches an available Bluetooth device through a Host Controller Interface (HCI) inquiry and receives information about an available service (e.g., information about a profile of the Bluetooth device) through an HCI response signal of the searched Bluetooth device.

The profile of a Bluetooth device is a definition of the arrangement of protocols for protocol applications, and includes a set of commands set to drive a Bluetooth device according to a service provided by the Bluetooth device. The profile of the Bluetooth device varies depending on the applications used, and a typical example of the profile is a Handsfree Profile (HF). In the handsfree profile, Bluetooth devices may be classified into a handsfree (HF) device and an audio gate (AG) device.

The hands free profile includes a headset profile (HSP). The HF device may be a mono/stereo headset or a handsfree device, and the AG device may be a portable terminal. The HF device and the AG device perform Bluetooth communication when a Service Link Connection (SLC) is connected therebetween.

The Bluetooth technology supports both data communication (such as voice and audio) that is sensitive to a delay time and high-rate data communication (such as packet data) that is less sensitive to a delay time. Two links are defined between Bluetooth devices for this type of communication. One of the two links is a Synchronous Connection-Oriented (SCO) link for voice data communication, and the other is an Asynchronous Connection-Less (ACLO link for packet data communication.

The Bluetooth technology provides three SCO channels and seven ACL channels between a master device requesting Bluetooth communication and slave devices receiving the request. However, if an SLC link is connected between Bluetooth devices (i.e., between a master and a slave) to perform communication, the connected SLC link must be released to connect an SLC link and performs communication with another device.

More particularly, without a disconnection request of the AG device and the HF device, one HF device cannot selectively connect a service and an SCO channel with respect to a plurality of AG devices. Also, one AG device cannot selectively connect a service and an SCO channel with respect to a plurality of HG devices.

Therefore, what is required is an apparatus and method for connecting with another HF device without disconnecting a service link during the performance of Bluetooth communication.

SUMMARY OF THE INVENTION

An exemplary aspect of the present invention is to provide a Bluetooth apparatus and method for connecting with a plurality of handsfree devices in a portable terminal.

Another exemplary aspect of the present invention is to provide an apparatus and method in which a portable terminal detects a hands free device to be connected from among adjacent hands free devices.

Another exemplary aspect of the present invention is to provide an apparatus and method in which a portable terminal detects a hands free device to be connected by sensing a motion in a portable terminal.

In accordance with an exemplary aspect of the present invention, an apparatus for connecting with a plurality of Bluetooth devices in a portable terminal preferably includes: a position determining unit for searching a second Bluetooth device by using a movement direction of the terminal, when performing a call by the second Bluetooth device while maintaining a call; and a Bluetooth connecting unit for processing the performance of a call using a first Bluetooth device and the second Bluetooth device, wherein, when searching the second Bluetooth device, the Bluetooth connecting unit releases the connection of the first Bluetooth device while maintaining the call and performs a connection with the second Bluetooth device.

In accordance with another exemplary aspect of the present invention, a method for connecting with a plurality of Bluetooth devices in a portable terminal includes: performing a call by a first Bluetooth device; searching a second Bluetooth device by a movement direction of the terminal, when performing a call by the second Bluetooth device while maintaining the call; releases the connection of the first Bluetooth device while maintaining the call, when searching the second Bluetooth device; and performing a connection with the second Bluetooth device.

Other exemplary aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent to a person of ordinary skill in the art from the following detailed description taken in conjunction with the accompanying drawings, in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of certain exemplary embodiments of the invention provided herein for illustrative purposes. The description includes various specific details to assist a person of ordinary skill the art with understanding the claimed invention, but these details are to be regarded as merely exemplary. Accordingly, those of ordinary skill in the art will recognize that various changes and modifications of the illustrative examples described herein can be made without departing from the spirit of the invention and the scope of the appended claims. Further, for the purposes of clarity and simplicity, descriptions of well-known functions and constructions may be omitted as their inclusion may obscure appreciation of the subject matter of the claimed invention by a person of ordinary skill in the art.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustrative purposes only and is not to be construed as limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

By the term "substantially" it is typically meant that the recited characteristic, parameter, or value need not be achieved exactly, but that deviations or variations, including but in no way limited to, for example, tolerances, measurement error, measurement accuracy limitations and other factors known to persons of ordinary skill in the art, may occur in amounts that do not preclude the effect the characteristic was intended to provide.

The present invention provides an apparatus and method of a portable terminal that permits switching a call to a peripheral Bluetooth device.

Figure 1:
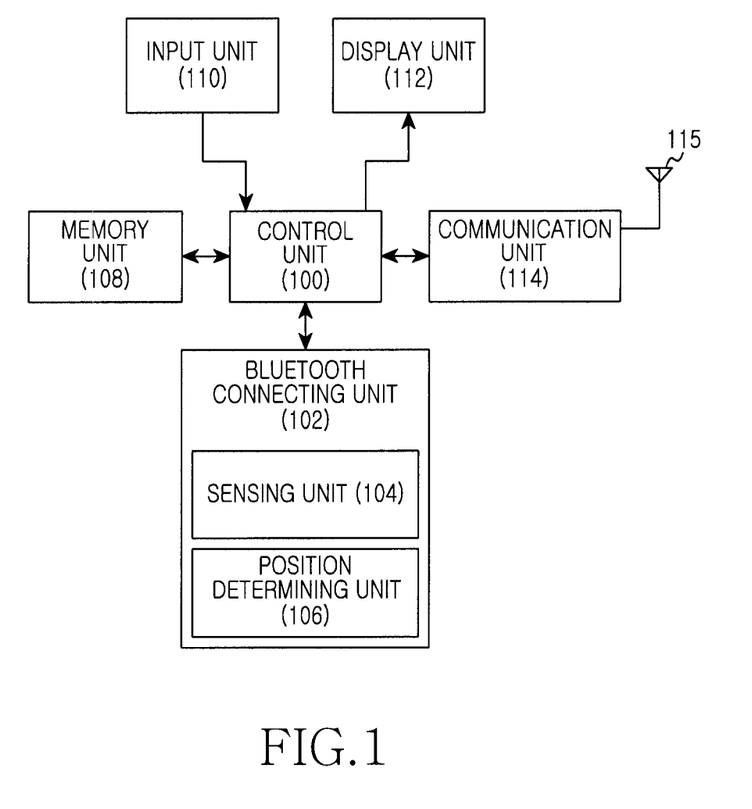
FIG. 1 is a block diagram of a portable terminal capable of connecting with a plurality of handsfree devices by a Bluetooth function according to an exemplary embodiment of the present invention.

FIG. 1 is a block diagram of a portable terminal capable of connecting with a plurality of handsfree devices by a Bluetooth function according to an exemplary embodiment of the present invention.

Referring now to the example shown FIG. 1, the portable terminal preferably includes a control unit 100, a Bluetooth connecting unit 102, a non-transitory memory unit 108, an input unit 110, a display unit 112, and a communication unit 114. The Bluetooth connecting unit 102 may include a sensing unit 104 and a position determining unit 106.

The control unit 100, which typically contains a processor or microprocessor, controls an overall operation of the portable terminal. For example, the control unit 100 processes and controls voice communication and data communication. In addition to controlling the general functions of the portable terminal, according to the present invention, the control unit 100 performs a control operation to switch a call to a peripheral Bluetooth device while performing a call connection by Bluetooth communication. For example, while performing a call connection with the other party by a Bluetooth headset A, the control unit 100 performs a control operation to switch the call connection to a Bluetooth headset B so that a user of the portable terminal maintains the call connection with the other party by the Bluetooth headset B.

Herein, the control unit 100 controls the Bluetooth connecting unit 102 to switch a connected call to a peripheral Bluetooth device.

In general, the Bluetooth connection unit 102 performs a function for establishing a channel with a Bluetooth device to be connected. More particularly, the Bluetooth connection unit 102 performs service link (SLC) and synchronous connection (SCO) in order to communicate with a Bluetooth device. In addition, according to the present invention, the Bluetooth connection unit 102 switches a connection with a connected Bluetooth device to another peripheral Bluetooth device under the control of the control unit 100.

Herein, the Bluetooth connection unit 102 may detect the other peripheral Bluetooth device to be connected, by sensing a movement of the portable terminal or by sensing a direct selection made by the user.

With continued reference to FIG. 1, the sensing unit 104 of the Bluetooth connection unit 102 obtains sensing information for determination of a movement of the portable terminal, and may include sensors such as gyro sensors and magnetic sensors. The sensing information obtained by the sensing unit 104 is provided to the position determining unit 106.

The position determining unit 106 of the Bluetooth connecting unit 102 detects the position of the portable terminal by using the sensing information received from the sensing unit 104, and provides the detected position information to the Bluetooth connecting unit 102.

The memory unit 108 is a non-transitory machine readable medium and preferably includes a ROM, a RAM and a flash ROM. However, other types of non-transitory machine readable mediums can be used with the presently claimed invention. The ROM stores various reference data and microcodes of a program for the process and control of the control unit 100 and the Bluetooth connecting unit 102. The RAM is a working memory of the control unit 100, which stores temporary data that are generated during the execution of various programs. The flash ROM stores various updatable data such as phone book, outgoing messages, and incoming messages.

The input unit 110 includes either physical keybuttons or virtual keys that include numeric keys of digits 0-9 and a plurality of function keys, such as a Menu key, a Cancel (Delete) key, a Confirmation key, a Talk key, an End key, an Internet connection key, Navigation keys, and character input keys. The input unit 110 provides the control unit 100 with key input data that corresponds to a key pressed by the user.

The display unit 112 displays numerals and characters, moving pictures, still pictures and status information generated during an operation of the portable terminal. The display unit 112 may be a color liquid crystal display (LCD). If the display unit 112 has a touch input device and is applied to a touch input type portable terminal, the display unit can be used as an input device, and the input unit 110 can be optional or a mouse.

The communication unit 114 transmits/receives Radio Frequency (RF) signals inputted/outputted through an antenna 115. For example, in a transmitting (TX) mode, the communication unit 114 channel-encodes, spreads and RF-processes TX data prior to transmission. In a receiving (RX) mode, the communication unit 114 converts a received RF signal into a baseband signal and despreads and channel-decodes the baseband signal to restore the original data. Also, the communication unit 114 may include a Bluetooth module for communicating with the Bluetooth device.

The control unit 100 may be configured to also perform the functions of the Bluetooth connecting unit 102. Although separate units are provided for respective functions of the control unit 100, those skilled in the art will readily understand that the control unit 100 may be configured to also perform all or some of the functions on behalf of such separate units. Thus, integration of some or most of the units is within the spirit of the claimed invention, which is shown in separate units to facilitate understanding by the person of ordinary skill in the art.

Figure 2:
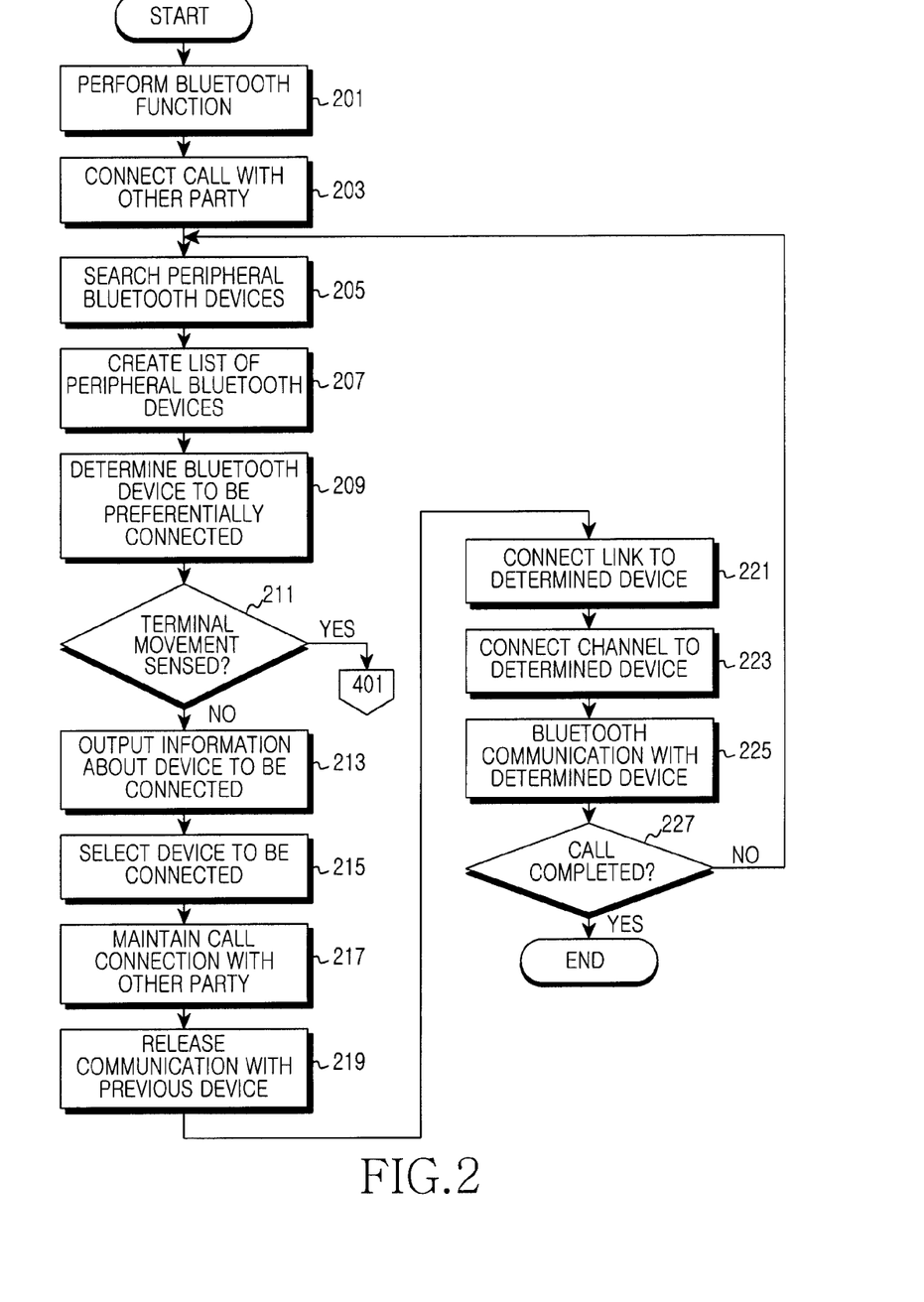
FIG. 2 is a flow diagram illustrating a process of performing a Bluetooth connection with a plurality of handsfree devices in the portable terminal according to an exemplary embodiment of the present invention.

FIG. 2 is a flow diagram illustrating a process of performing a Bluetooth connection with a plurality of handsfree devices in the portable terminal according to an exemplary embodiment of the present invention.

Referring now to FIG. 2, at step 201 the portable terminal performs a Bluetooth function by connecting a call connection with the other party (in this example the "second party") in step 203. More particularly, the portable terminal performs a call with the second party by a Bluetooth headset, and communicates the Bluetooth headset after performing service link connection (SLC) and synchronous connection (SCO).

In step 205, the portable terminal searches for peripheral Bluetooth devices (Bluetooth headsets). In step 207, the portable terminal creates a list of the peripheral Bluetooth devices found in the search. Herein, the portable terminal periodically makes inquiry requests for peripheral Bluetooth headsets to search the peripheral devices. The creation of a list of the searched peripheral Bluetooth devices will now be described below in detail with reference to FIG. 3.

In step 209, the portable terminal determines a Bluetooth device from the list created at step 207 to be preferentially connected. In other words, in step 209, the portable terminal determines a device to be connected, in order to prevent a connection with an undesired device from among a plurality of peripheral devices within range.

In step 211, the portable terminal senses a terminal movement to determine a peripheral device to be preferentially connected.

Figure 4:
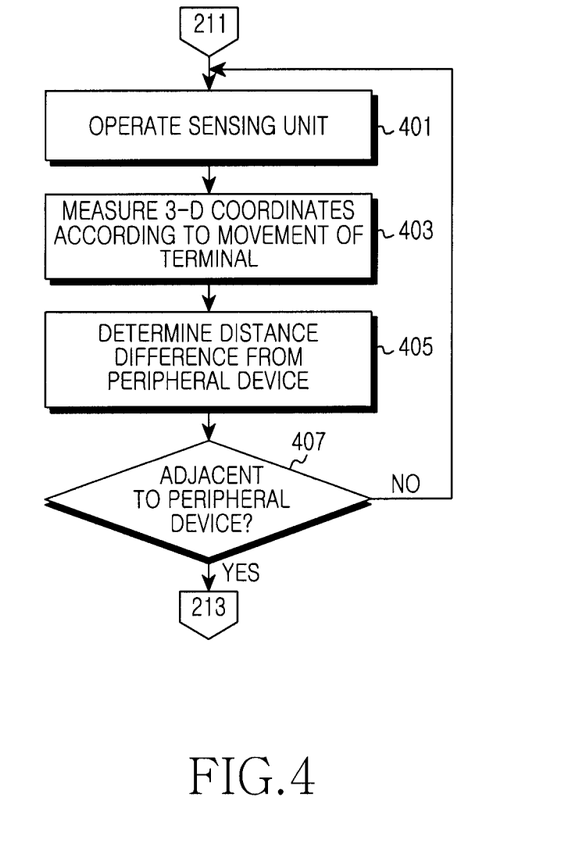
FIG. 4 is a flow diagram illustrating a process of determining a Bluetooth device to be preferentially connected, by sensing a terminal movement in the portable terminal according to an exemplary embodiment of the present invention.

If at step 211, the portable terminal senses a terminal movement to determine a peripheral device to be preferentially connected, the portable terminal proceeds to step 401 of FIG. 4.

On the other hand, if the user determines a peripheral device to be connected from among the Bluetooth device list (instead of sensing, by the portable terminal, a terminal movement to determine a peripheral device to be preferentially connected) (in step 211), the portable terminal then performs step 213. In step 213, the portable terminal outputs information about the device to be connected. More particularly, in step 213, the portable terminal outputs the list of the peripheral Bluetooth devices so that the user of the portable terminal can select a peripheral device to be connected.

At step 215, the portable terminal receives the user's selection of the device to be connected from among the outputted peripheral Bluetooth device list. At step 217, the portable terminal maintains the call connection with the other party (i.e. second party) performed in step 203.

In step 219, the portable terminal disconnects the communication with the peripheral Bluetooth device connected in step 201, in order to connect the peripheral Bluetooth device selected in step 216. Stated another way, the portable terminal performs an SLC release and an SCO release on the connected peripheral Bluetooth device.

At step 221, the portable terminal performs an SLC connection with the peripheral Bluetooth device selected in step 216 by the user. At step 223, the portable terminal also performs an SCO connection.

At step 225, the portable terminal performs a Bluetooth communication with the selected peripheral Bluetooth device and provides the communication contents to the user through the peripheral Bluetooth device.

In other words, while maintaining the call connection, the portable terminal switches the call connection from the Bluetooth device A (Bluetooth headset) to the Bluetooth device B.

Also, the portable terminal periodically creates a list of peripheral Bluetooth devices by using Received Signal Strength Indicator (RSSI) values. Accordingly, the call connection can be switched to the device with a "good" RSSI value whenever the order of devices with good RSSI values changes. Here, "good" may mean the greatest RSSI value among the values of the peripheral devices. Also, "good" may mean greater than a predetermined threshold RSSI value.

Thereafter, the portable terminal ends the algorithm according to the present invention.

Figure 3:
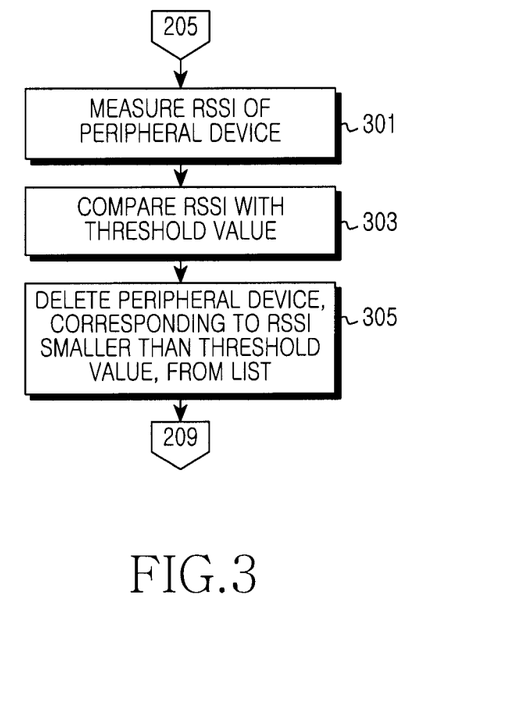
FIG. 3 is a flow diagram illustrating a process of creating a list of peripheral devices in the portable terminal according to an exemplary embodiment of the present invention.

FIG. 3 is a flow diagram illustrating a process of creating a list of peripheral devices in the portable terminal according to an exemplary embodiment of the present invention.

Referring now to FIG. 3, when making inquiry requests to search peripheral Bluetooth devices in step 205, FIG. 3 shows the details beginning with step 301 where the portable terminal measures an RSSI value.

At step 303, the portable terminal compares the measured RSSI values of the peripheral Bluetooth devices with a predetermined threshold value. Herein, the predetermined threshold value is a reference value for determining a Bluetooth device to be preferentially connected. The portable terminal may create a list of peripheral devices corresponding to the RSSI values greater than the predetermined threshold value. The portable terminal may create a list of peripheral devices in descending order of RSSI values, and may detect and output the device addresses and names of peripheral devices together with the list.

Accordingly, the portable terminal deletes from the created list in step 305 the peripheral devices that have RSSI values smaller than the predetermined threshold value, and then proceeds to step 209.

FIG. 4 is a flow diagram illustrating a process of determining a Bluetooth device to be preferentially connected, by sensing a terminal movement in the portable terminal according to an exemplary embodiment of the present invention.

Referring now to FIG. 4, when sensing a movement of the terminal to determine a Bluetooth device to be preferentially connected, the portable terminal operates the sensing unit in step 401. In step 403, the portable terminal obtains sensing information to measure three-dimensional (3-D) coordinates according to a movement of the terminal.

In step 405, the portable terminal determines a distance difference from the peripheral device. In step 407, the portable terminal determines (the controller determines) from this distance whether the portable terminal is positioned adjacent to the peripheral device.

If at step 407 the portable terminal is not adjacent to the peripheral device, the method returns to step 401.

On the other hand, if at step 407 it is determined by the portable terminal that the portable terminal is positioned adjacent to the peripheral device, the portable terminal proceeds to step 213 of FIG. 2 and outputs information about the peripheral device to be connected.

The exemplary embodiment of FIG. 4 illustrates one way of detecting the nearest peripheral device on the basis of the position of the portable terminal being moved to by the user, in order to solve the problem of the case where it is impossible to detect the nearest peripheral device from among a plurality of peripheral Bluetooth devices by using only the RSSI values.

Figure 5:
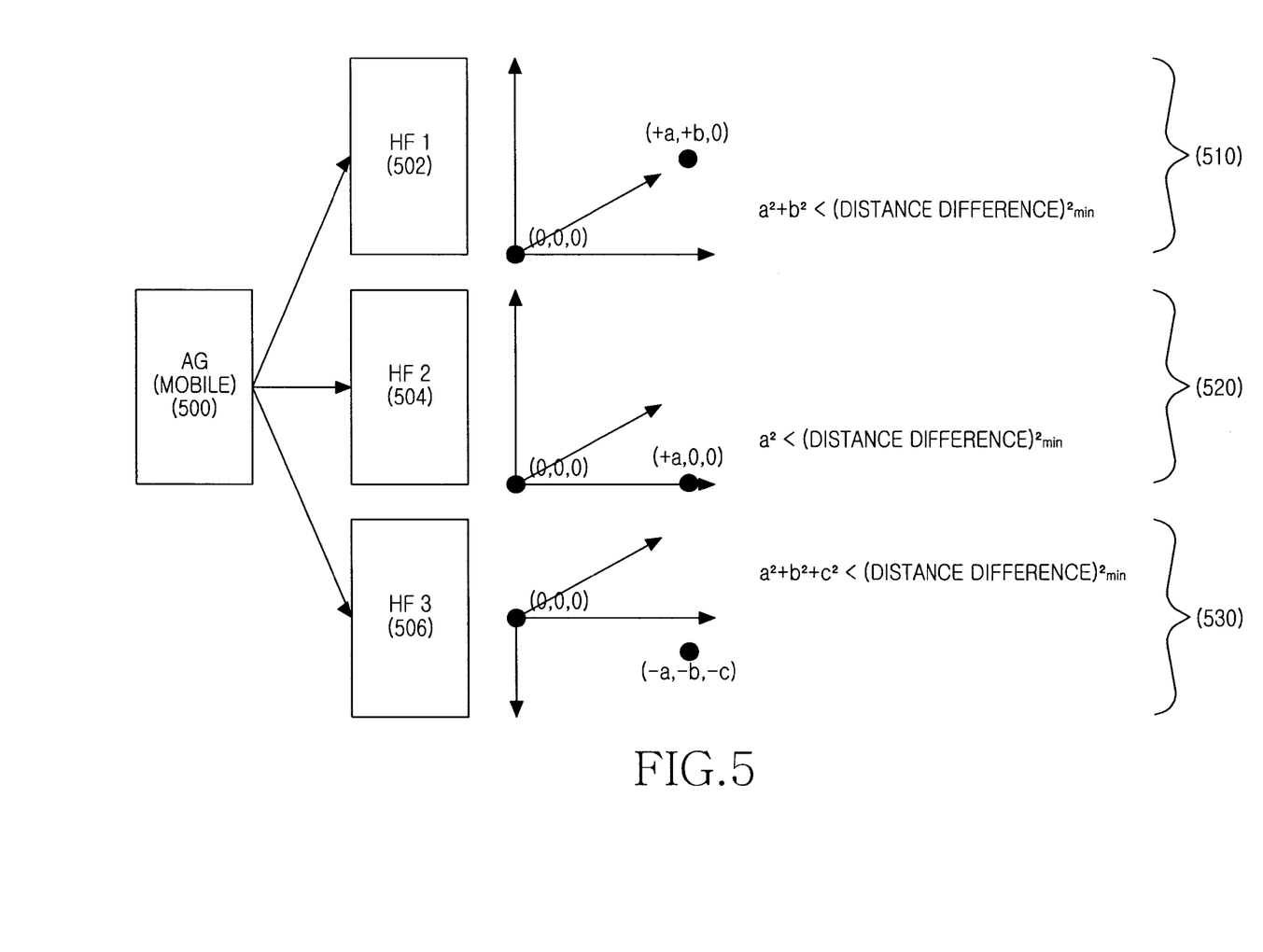
FIG. 5 is a diagram illustrating a process of searching peripheral devices according to a movement of the portable terminal according to an exemplary embodiment of the present invention.

FIG. 5 is a diagram illustrating a process of searching peripheral devices according to a movement of a portable terminal according to an exemplary embodiment of the present invention.

Referring now to FIG. 5, a portable terminal (Audio Gate (AG)) 500 includes a sensing unit for sensing a movement of the terminal, and operates the sensing unit to obtain sensing information.

Herein, the sensing information obtained by the sensing unit may be information about x, y, z axes used to determine the position or movement direction of the portable terminal 500.

A description will now be given of the case where the portable terminal 500 approaches a first handsfree (HF) device 502 as illustrated in FIG. 5.

When approaching the first handsfree device 502, the portable terminal 500 obtains sensing information (a, b, 0).

The portable terminal 500 compares the sensing information with the previous sensing information to determine the movement direction and movement position of the portable terminal, and determines the distance difference between the movement positions.

The portable terminal 500 having approached the first handsfree device 502 determines the value of $a^2+b^2$ and compares the determination value with a first threshold value. If the determination value is smaller than the first threshold value, the portable terminal determines that a peripheral device located in the movement direction of the terminal (i.e., in the direction of the first handsfree device) is a Bluetooth device to be preferentially connected (510). Accordingly, even if there is a peripheral device having the same RSSI value as the first handsfree device, the portable terminal detects the movement direction of the terminal and attempts to communicate with the first handsfree device.

Likewise, when approaching a second handsfree device 504, the portable terminal 500 obtains sensing information (a, 0, 0).

The portable terminal 500 having approached the second handsfree device 504 determines the value of $a^2$ and compares the determination value with a second threshold value. If the determination value is smaller than the second threshold value, the portable terminal determines that a peripheral device located in the movement direction of the terminal (i.e., in the direction of the second handsfree device) is a Bluetooth device to be preferentially connected (520).

Also, when approaching a third handsfree device 506, the portable terminal 500 obtains sensing information (a, b, c).

The portable terminal 500 having approached the third handsfree device 506 determines the value of $a^2+b^2+c^2$ and compares the determination value with a third threshold value. If the determination value is smaller than the third threshold value, the portable terminal determines that a peripheral device located in the movement direction of the terminal (i.e., in the direction of the third handsfree device) is a Bluetooth device to be preferentially connected (530). Herein, if the Bluetooth device to be preferentially connected is not included in a registered device list, the portable terminal registers the Bluetooth device by determining it as a new device.

Regarding the description of FIG. 5, the first threshold value, the second threshold value and the third threshold value may be the same value or not. Accordingly, the user of the portable terminal 500 can change Bluetooth devices without releasing the current call connection by moving the portable terminal 500 near to the handsfree device. That is, if the user of the portable terminal 500 moves the portable terminal 500 to the position corresponding to the sensing information (a, b, c) while connecting the first handsfree device 502, the portable terminal 500 may create a list of peripheral devices by detecting the RSSI values with respect to the second handsfree device 504 and the third handsfree device 506. However, the portable terminal 500 determines the distance difference between the second handsfree device 504 and the third handsfree device 506, and determines that a peripheral device having the distance difference smaller than a threshold value is the third handsfree device 506 and determines that the third handsfree device 506 is a Bluetooth device to be preferentially connected.

Figure 6:
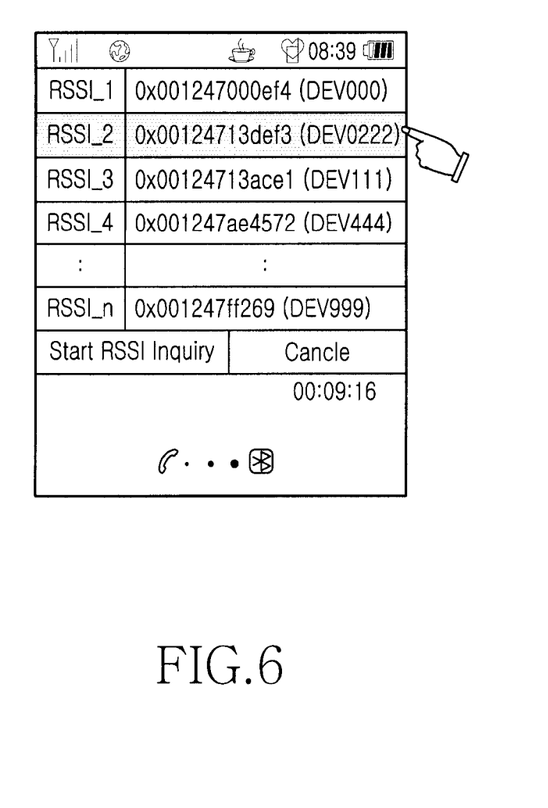
FIG. 6 is a diagram illustrating a display screen of the portable terminal for attempting a new connection with a peripheral device according to an exemplary embodiment of the present invention.

FIG. 6 is a diagram illustrating a display screen of the portable terminal for attempting a new connection with a peripheral device according to an exemplary embodiment of the present invention.

Referring now to FIG. 6, the portable terminal searches peripheral Bluetooth devices, creates a list of peripheral devices, outputs the created list, and connects with the device selected by the user, regardless of the position of the portable terminal.

More particularly, if a list including an RSSI value order and device information corresponding to the RSSI value order is outputted as illustrated in FIG. 6, the user of the portable terminal selects a device to be connected.

If the user selects a device corresponding to the second order as illustrated in FIG. 6, the portable terminal releases a synchronous connection (SCO) with the connected device and then releases a service link (SLC) connection. Thereafter, the portable terminal may perform a service link connection and a synchronous connection with the new handsfree device selected by the user.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

As described above, the present invention makes it possible to switch a call to a plurality of handsfree devices in the portable terminal. The present invention establishes a channel with the adjacent handsfree device after terminating the current handsfree connection while maintaining the current call connection, thus making it possible to switch a call connection to a device desired by the user.

While the invention has been shown and described with reference to certain preferred exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An apparatus for connecting with a plurality of Bluetooth devices in a portable terminal, comprising:
   a processor to:
   connect the portable terminal engaged in a call with a first Bluetooth hands free device using a Bluetooth connecting unit;
   compare three dimensional coordinates of the portable terminal with that of a second Bluetooth hands free device using a position determining unit, while engaged in the call using the first Bluetooth hands free device; and
   switch a connection with the first Bluetooth hands free device to the second Bluetooth hands free device such that the portable terminal is engaged in the call with the second Bluetooth hands free device, when a difference between the three dimensional coordinates of the portable terminal and the second Bluetooth hands free device is below a threshold.

2. The apparatus of claim 1, wherein the position determining unit creates a list of a plurality of peripheral devices based on an order of signal strength utilizing Received Signal Strength Indicator (RSSI) values to search the second Bluetooth hands free device.

3. The apparatus of claim 2, wherein the position determining unit compares the RSSI values of the plurality of peripheral devices with a predetermined threshold value, and creates a list of peripheral devices having RSSI values greater than the predetermined threshold value.

4. The apparatus of claim 2, wherein the second Bluetooth hands free device comprise one peripheral device having a good RSSI value from among the list of the peripheral devices.

5. The apparatus of claim 1, wherein the position determining unit measures the three dimensional coordinates according to a detected movement of the terminal by using a sensing unit, and determines a movement direction of the terminal.

6. The apparatus of claim 1, wherein the Bluetooth connecting unit searches for the second Bluetooth hands free device, and connects with the second Bluetooth hands free device when it is determined that the second Bluetooth hands free device is an authorized device.

7. The apparatus of claim 1, wherein the Bluetooth connecting unit switches the call to the second Bluetooth hands free device from the first Bluetooth hands free device, when a selection of the second Bluetooth hands free device is detected.

8. The apparatus of claim 1, wherein the Bluetooth connecting unit releases a Service Link Connection (SLC) link and a Synchronous Connection-Oriented (SCO) link with the first Bluetooth hands free device while maintaining the call, and performs an SLC connection and an SCO connection with the second Bluetooth hands free device to perform with the second Bluetooth hands free.

9. The apparatus of claim 1, wherein at least one of the first Bluetooth hands free device and the second Bluetooth hands free device comprises a headset.

10. The apparatus of claim 1, wherein the position determining unit comprises at least one of as gyro sensors or magnetic sensors to detect a movement direction of the portable terminal.

11. A method for connecting with a plurality of Bluetooth devices in a portable terminal, comprising:
    engaging a portable terminal in a call with, a first Bluetooth hands free device;
    comparing three dimensional coordinates of the portable terminal with that of a second Bluetooth hands free device, while engaged in the call using the first Bluetooth hands free device; and
    switching a connection with the first Bluetooth hands free device to the second Bluetooth hands free device such that the portable terminal is engaged in the call with the second Bluetooth hands free device, when a difference between the three dimensional coordinates of the portable terminal and the second Bluetooth hands free device is below a threshold.

12. The method of claim 11 further comprising creating a list of peripheral devices by using Received Signal Strength Indicator (RSS) values, and storing in a memory or displaying on a display the created list.

13. The method of claim 12, wherein the creating of the list of the peripheral devices comprises:
    measuring RSSI values of the peripheral devices;
    comparing the measured RSSI values with a predetermined threshold value; and
    creating the list of peripheral devices corresponding to the RSSI values greater than the predetermined threshold value.

14. The method of claim 12, wherein the second Bluetooth hands free device comprises the device having an RSSI value greater than or equal to the predetermined threshold value from among the list of the peripheral devices.

15. The method of claim 11, wherein comparing three dimensional coordinates comprises:
    operating a sensing unit for sensing a movement of the terminal;
    measuring the three dimensional coordinates of the terminal in accordance with a movement of the terminal; and
    determining a movement direction of the terminal using the three dimensional coordinates.

16. The method of claim 11, further comprising:
  searching the second Bluetooth hands free device and determining whether the second Bluetooth hands free device comprises an authorized device; and
  connecting with the second Bluetooth hands free device when it is determined that the second Bluetooth hands free device comprises the authorized device.

17. The method of claim 11, further comprising switching the call to the second Bluetooth hands free device from the first Bluetooth hands free device, when selection of the second Bluetooth hands free device is detected.

18. The method of claim 11, wherein the performing of the call by the second Bluetooth hands free device while maintaining the call comprises releasing a Service Link Connection (SLC) link and a Synchronous Connection-Oriented (SCO) link with the first Bluetooth hands free device while maintaining the call, and performing an SLC connection and an SCO connection with the second Bluetooth hands free device.

19. The method according to claim 11, wherein at least one of the first Bluetooth hands free device and the second Bluetooth hands free device comprises a headset.

20. The method according to claim 18, wherein at least one of the first Bluetooth hands free device and the second Bluetooth hands free device comprises a headset.

* * * * *

UNITED STATES PATENT AND TRADEMARK OFFICE
CERTIFICATE OF CORRECTION

| | |
|---|---|
| PATENT NO. | : 8,903,316 B2 |
| APPLICATION NO. | : 13/286491 |
| DATED | : December 2, 2014 |
| INVENTOR(S) | : Jin-Ho Jang |

Page 1 of 1

It is certified that error appears in the above-identified patent and that said Letters Patent is hereby corrected as shown below:

In the Claims

Column 10, Claim 8, Line 21 should read as follows:
--...Bluetooth hands free device...--

Column 10, Claim 11, Line 31 should read as follows:
--...call with a first...--

Column 10, Claim 12, Line 44 should read as follows:
--...claim 11, further comprising...--

Signed and Sealed this
Tenth Day of March, 2015

Michelle K. Lee
*Deputy Director of the United States Patent and Trademark Office*